US011949680B2

(12) United States Patent
Ramamurthi et al.

(10) Patent No.: US 11,949,680 B2
(45) Date of Patent: Apr. 2, 2024

(54) FRAMEWORK FOR CUSTOMER CONTROL AND AUDITING OF OPERATOR ACCESS TO INFRASTRUCTURE IN A CLOUD SERVICE

(71) Applicant: Oracle International Corporation, Redwood Shores, CA (US)

(72) Inventors: Prasanna Ramamurthi, Bangalore (IN); Joydip Kundu, Nashua, NH (US); Binoy Sukumaran, Foster City, CA (US); Krishna Chander, San Ramon, CA (US); Jeffrey Wright, Superior, CO (US)

(73) Assignee: Oracle International Corporation, Redwood Shores (CA)

( * ) Notice: Subject to any disclaimer, the term of this patent is extended or adjusted under 35 U.S.C. 154(b) by 263 days.

(21) Appl. No.: 17/245,943

(22) Filed: Apr. 30, 2021

(65) Prior Publication Data

US 2022/0353266 A1 Nov. 3, 2022

(51) Int. Cl.
*H04L 9/40* (2022.01)
*G06Q 10/105* (2023.01)
*G06Q 30/01* (2023.01)
*H04L 9/30* (2006.01)

(52) U.S. Cl.
CPC ......... *H04L 63/102* (2013.01); *G06Q 10/105* (2013.01); *G06Q 30/01* (2013.01); *H04L 9/30* (2013.01); *H04L 63/20* (2013.01)

(58) Field of Classification Search
CPC ......... H04L 63/102; H04L 9/30; H04L 63/20; G06Q 10/105; G06Q 30/01
See application file for complete search history.

(56) References Cited

U.S. PATENT DOCUMENTS

| 8,769,622 B2 | 7/2014 | Chang et al. |
| 8,909,928 B2 | 12/2014 | Ahmad et al. |
| 10,454,934 B2 | 10/2019 | Parimi et al. |
| 10,579,800 B2 | 3/2020 | Blundell |
| 2012/0011578 A1* | 1/2012 | Hinton ............... H04L 63/0815 726/8 |
| 2017/0302677 A1* | 10/2017 | Dani .................... G06F 21/6218 |
| 2018/0337906 A1* | 11/2018 | Spektor ................. G06F 21/604 |
| 2018/0349625 A1* | 12/2018 | Ikram .................... H04L 63/10 |

OTHER PUBLICATIONS

Baldwin, et al., "Customer Lockbox for Microsoft Azure," Microsoft Docs, dated May 11, 2022, URL: https://docs.microsoft.com/en-us/azure/security/fundamentals/customer-lockbox-overview.
Kalarickal, S., "Approve, audit support access requests to VMs using Customer Lockbox for Azure," Azure, dated Oct. 21, 2018, URL: https://azure.microsoft.com/en-in/blog/approve-audit-support-access-requests-to-vms-using-customer-lockbox-for-azure/.

(Continued)

*Primary Examiner* — Matthew Smithers
*Assistant Examiner* — Shu Chun Gao
(74) *Attorney, Agent, or Firm* — Vista IP Law Group, LLP

(57) ABSTRACT

Disclosed is an improved approach to implement a mechanism to provide customer control over access to cloud infrastructure by the cloud provider's operator employees. This mechanism allow customer controlled access to any cloud infrastructure that belongs to or is otherwise allocated to the customer.

29 Claims, 6 Drawing Sheets

(56) References Cited

OTHER PUBLICATIONS

"Shared Responsibility Model," AWS, date found via Internet Archive as Jul. 8, 2020, URL: https://aws.amazon.com/compliance/shared-responsibility-model/.
"Understanding shared responsibility with Zoho," dated Jul. 12, 2020, URL: https://www.zoho.com/shared-responsibility.html.
"Security practices," Atlassian, date found via Internet Archive as Aug. 14, 2020, URL: https://www.atlassian.com/trust/security/security-practices#security-philosophy.

* cited by examiner

FRAMEWORK FOR CUSTOMER CONTROL AND AUDITING OF OPERATOR ACCESS TO INFRASTRUCTURE IN A CLOUD SERVICE

BACKGROUND

In a cloud computing environment, computing systems may be provided as a service to customers. One of the main reasons for the rising popularity of cloud computing is that the cloud computing model typically allows customers to avoid or minimize both the upfront costs, as well as ongoing costs, associated with maintenance of IT infrastructures. Moreover, the cloud computing paradigm permits high levels of flexibility for the customer with regards to its usage and consumption requirements for computing resources, since the customer only pays for the resources that it actually needs rather than investing in a massive data center infrastructure that may or may not actually be efficiently utilized at any given period of time.

The cloud resources may be used for any type of purpose or applicable usage configuration by a customer. For example, the cloud provider might host a large number of virtualized processing entities on behalf of the customer in the cloud infrastructure. The cloud provider may provide devices from within its own infrastructure location that are utilized by the cloud customers. In addition, the cloud provider may provide various services (e.g., database services) to customers from the cloud. As yet another example, the cloud provider may provide the underlying hardware device to the customer (e.g., where the device is located within the customer's own data center), but handle implementation and administration of the device as part of the cloud provider's cloud environment.

One of the main functions performed by the cloud provider in the cloud computing model is the administration and maintenance of the cloud computing resources. By having the administrative staff of the cloud provider take control over these administrative tasks, this minimizes the need and costs for the customer to maintain its own IT staffing and infrastructure to handle these tasks, which is in essence one of the main advantages of the cloud computing paradigm for customers. To perform these tasks, the typical scenario is for the cloud provider's administrative staff to have full and unfettered ability to access and perform administrative functions within the cloud resources.

However, this model works poorly, or does not work at all, for regulated customers, such as banks and medical providers. The primary reason for this is that a regulated customer is, according to applicable contractual or legal requirements, supposed to be responsible for controlling the actions on every aspect of the system supporting their applications, and this responsibility is independent of the owner of the equipment or the origin of the staff performing actions on said equipment. Moreover, regulated customers often have to prove to their regulators that they are in complete control of these systems (e.g., in terms of knowing what actions were taken on the system), and that they are operating their systems in compliance with those regulations. These requirements for the regulated customers are in conflict with the conventional cloud computing scenario where the cloud provider's administrative operators—and not the cloud customer—have complete control over the cloud infrastructure resources.

Therefore, there is a need for an improved approach to implement a cloud computing environment that addresses the issues identified above.

SUMMARY

Some embodiments are directed to an approach for implementing a mechanism to provide customer control over access to cloud infrastructure by the cloud provider's operator employees. This mechanism will allow customer controlled access to any cloud infrastructure that belongs to or is otherwise allocated to the customer.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Some embodiments are directed to an approach for implementing a mechanism to provide customer control over access to cloud infrastructure by the cloud provider's operator employees. This mechanism will allow customer controlled access (also referred to as "CCA") to any cloud infrastructure that belongs to or is otherwise appropriately allocated to the customer.

Figure 1:
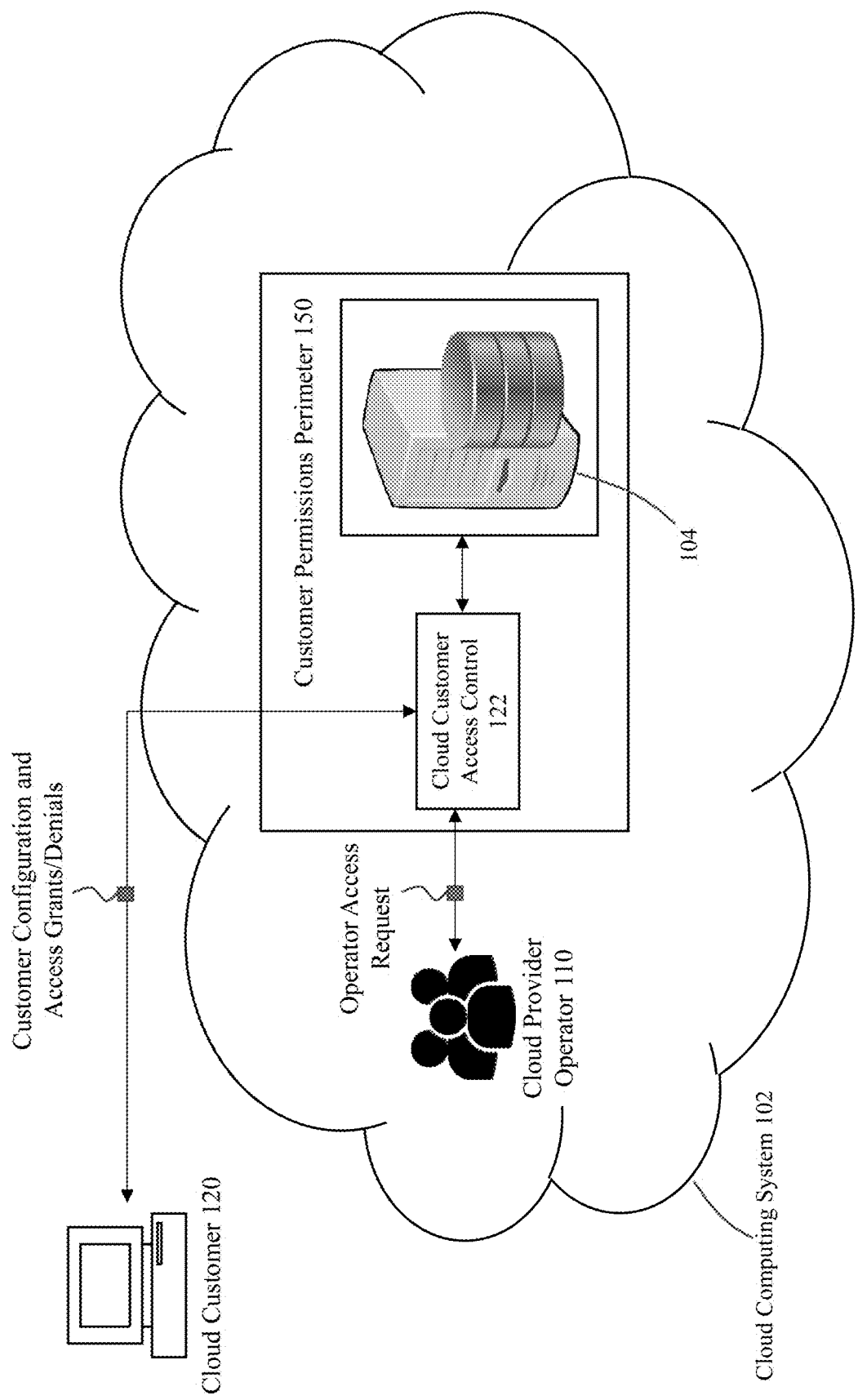
FIG. 1 provides a high level illustration of this mechanism according to some embodiments of the invention.

FIG. 1 provides a high level illustration of this mechanism according to some embodiments of the invention. This figure shows a cloud computing system 102 that includes one or more cloud infrastructure resources 104 that are used by one or more cloud customers 120.

The cloud infrastructure resources 104 correspond to any type of infrastructure resource that may be allocated and used within a cloud computing environment. For example, the cloud infrastructure resources 104 may correspond to a hardware device that is shipped to a customer to use in the customer's own data center, but where the device forms part of a cloud provider's cloud environment that is maintained by the cloud provider's administrative employees. In this cloud deployment model, the customer may be responsible for the application/user-space level activities on the device, e.g., the operation and implementation of virtual machines, and/or the management of database management software that reside on machine. However, the cloud provider is responsible for management of the infrastructure components for that device (e.g., chassis power, bare metal operating system, hypervisors, storage services, networking services, etc.). In an alternative embodiment, the cloud infrastructure resource 104 is owned by the cloud provider and located within the cloud provider's own data center.

In the conventional implementations of these models, the customer has unfettered access to components they are responsible for, and the cloud provider's employee administrators have unfettered access to components that the cloud provider is responsible for. While this model works for some portions of the cloud market, this model works poorly, or does not work at all, for regulated customers, such as banks and medical providers. As previously noted, the primary reason for this problem is that a regulated customer is responsible for controlling the actions on every aspect of the system supporting their applications, and this responsibility is independent of the owner of the equipment or the origin of the staff performing actions on said equipment. Moreover, regulated customers often have to prove to their regulators that they are in complete control of these systems, and that they are operating their systems in compliance with those regulations.

To address these issues, some embodiments of the invention provide a cloud customer access control mechanism 122 that allows a cloud customer 120 to implement customer control over access to the cloud infrastructure resources 104 by cloud provider operators 110. In effect, the cloud customer access control mechanism 122 creates a customer permissions perimeter 150 that allows the cloud customer to manage the extent, timing, and approval process for access to the cloud infrastructure resources 104 that are associated with the cloud customer 120.

Figure 2A:
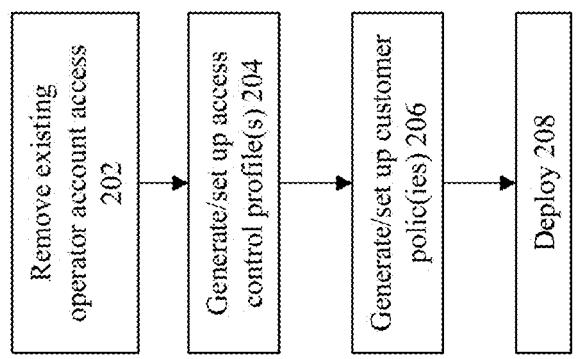
FIG. 2A shows a flowchart of steps to configure and set up the customer controlled access mechanism according to some embodiments of the invention.

FIG. 2A shows a flowchart of steps to configure and set up the customer controlled access mechanism according to some embodiments of the invention. At step 202, existing operator accounts are removed from the system. Prior to implementation of the invention, it is possible that the cloud provider's employee operators have already been provided access to the cloud infrastructure, and hence user accounts have already been created and currently exist for these cloud operators. Step 202 is performed to remove or otherwise disable these accounts so that cloud operators will no longer be able to use these previously-created accounts to access the cloud infrastructure.

At 204, one or more access control profiles ("ACPs") are created in the system. These access control profiles pertain to named and pre-defined profiles of the commands/files/network which can be accessed on a given layer. In some embodiments, these profiles are established and owned by the cloud provider.

The kind of control that can be enforced by ACPs defines the technology chosen to implement the possible enforcements. The enforcement can be on any level of granularity, e.g., at the user level, file system level, kernel access level, and/or on a resources level such as, for example, for a CPU or memory.

The control profiles may be used to enforce a semi-sandbox state, and may enforce what a cloud operator user can access in the system. The control profiles may also be used to enforce what the cloud operator is permitted to do in the system, e.g., pertaining to execution of shell (OS) commands, operator-developed scripts, database commands, cloud tooling commands, and/or DB client tools.

By way of illustration, an example profile called "DOM0_FILE_SYSTEM_DEBUG" may be configured having the following parameters: (a) this profile has read-only access to all files on DOM0; (b) this profile cannot execute any command to leave the DOM0; (c) this profile cannot start any child shell; (d) this profile cannot write anything to the filesystem.

At step 206, one or more customer control policies (CCCA policies) may be generated and/or configured. This is a customer-defined entity which contains a grouping of the access control profiles that are allowed and/or restricted. The policy may include a list of customer users who have permissions to approve/revoke access. In some embodiments, the CCA policy may define criteria for the users who may access the infrastructure. This could be due to, for example, legal requirements of the customer's industry and/or contractual requirements imposed upon the customer.

In some embodiments, the CCA policy is created by a customer with some or all of the following attributes: (a) policy name, where the policy name should be a unique name within the tenancy; (b) identification of customer users with approval rights, which are the rights to approve access requests; (c) a policy description; (d) user attributes of the policy, which pertain to rules for the users who will request access; (e) ACPs which are automatically approved as per the policy, and in which ACPs not explicitly allowed will require approval; and/or (f) policies that are audit-only, where all ACPs are allowed automatically with only access logging enabled.

Thereafter, at step 208, the various policies are deployed within the system. This is the action by which the one or more policies are associated with cloud resources within the system. Once the policy has been deployed, any operator access to the resource will be governed by the policy. The deployment can be of any length of time, e.g., made permanent or for only a specific duration.

Figure 2B:
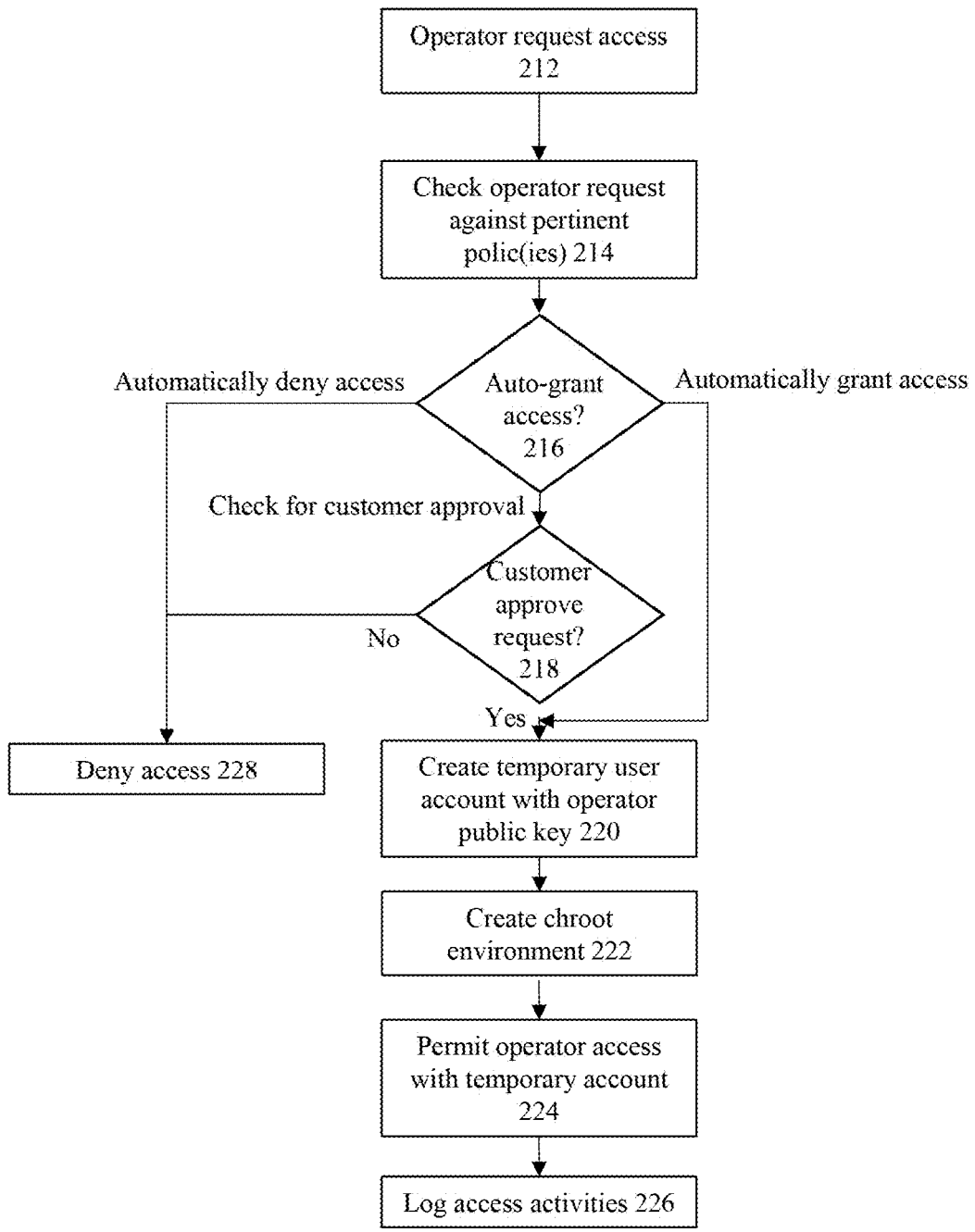
FIG. 2B shows a flowchart of steps to manage access by operators according to some embodiments of the invention.

FIG. 2B shows a flowchart of steps to manage access by operators according to some embodiments of the invention. At 212, a request is received for access by an operator to a cloud resource. In some embodiments, the request includes one or more of the following: (a) the identifier of the specific resource for which access is requested; (b) the ACP that is being requested by the operator; (c) the time duration for the request; and/or (d) for auditing purposes, the reason for which the request is being made.

At 214, the operator request is checked against the polic(ies) that are pertinent to the request. At 216, a determination is made whether the automatic approval can be made for the access request. With certain embodiments of the invention, distinctions are made between different types of requests, where certain requests are deemed appropriate for automatic processing, while other requests are deemed appropriate for explicit customer approvals. For example, certain types of ACPs that pertain to read-only access of non-sensitive system information may be designated as eligible for automatic approvals (subject to logging as described in more detail below). However, other types of access to more sensitive information or activities may require explicit customer approval.

If the request is of the type that should be automatically denied, then the process will proceed to step 228 to deny the requested operator access. On the other hand, if the request is of the type that should be automatically approved, then the process will proceed to step 220 to implement steps to allow access by the operator.

If the access request is not of a type that would be amenable to automated approval/denial, then the processing will proceed to step 218, where an additional check is made with the customer to determine whether the customer will approve or deny the requested operator access. In particular, the request will be routed to the designated approver entity/user at the customer to receive the customer instruction for how to proceed.

The access requested by the operator user is mapped to a set of approving customer users. This mapping is done through the CCA policy that is in-force on the corresponding resource. The CCA system checks if the user attributes of the policy and the requesting Ops user are compatible. If not compatible, the system auto rejects the request. When the access request is raised, there is an event posted on the corresponding CCA policy system field/location stating an access request is pending for approval, which triggers a notification to the appropriate customer user(s). The customer user would then log in to approve/deny the corresponding access request. During the approval process, the customer user can change the duration for which the access is sought. The customer may also request additional logging for this access.

Upon approval for the operator access, at step 220, a temporary user account is created for the operator access on the target resource. For example, in some systems, a new user (e.g., a Linux user) can be created on the target resource. The user is created to ensure clear access control and auditability for the operator user actions. As the user is created as a new temporary account, there is no existing privilege in the system. The user is deleted once the access expires and hence it is a clear removal of privilege.

In particular, the new temporary user is created that is seeded using the public key for the operator for which the request is being sought. To generate this user, the CCA system will log into into the corresponding layers to create the user, where this login is a performed as root. The temporary user that is created will only have the permissions granted by the specific ACP approved by the customer. After the temporary user is dynamically generated, the username and key are posted to the requesting operator user.

Next, at step 222, a chroot environment is created for the temporary user account. A chroot on a Unix-based operating system (such as Linux) is an operation that changes the apparent root directory for the current running process and its children. The programs that run in this modified environment cannot access the files outside the designated directory tree. This essentially limits their access to a directory tree and thus they get the name "chroot jail". This means that the cloud operator will only be able to perform its activities within the scope of the directory tree for the chroot environment that is created for the temporary user account.

At 224, the operator will now be permitted to access the cloud resource using the temporary username that has been created for the operator using the operator's public key. For example, the operator may use a secure shell (SSH) to perform key-based log-in to access to the cloud resource using the temporary username that has been created for the operator.

Thereafter, the operator will be permitted to perform the activities permitted by the corresponding ACP. For example, the allowed activities may include a defined set of commands executable by the operator user. These commands could be direct like issuing a "ls" on the linux machine or indirect like a shell script executed which invokes "ls". Activities are limited to this definition and not further such as syscalls invoked or the libraries invoked by the user. It is possible that in some cases there is a delegated execution where a command is executed by the user which submits a request to a daemon running on the system. This daemon performs the command on behalf of the user. These also will be logged.

At step 226, the activities by the operator user are logged by the system. The activity monitoring is performed through audit logs generated for the activities performed by the operator, with logs being made available to the customer. One aspect of the monitoring is the ability to post the monitor logs to the customer. In some embodiments, the posted logs will include one, some or all of the following information: (a) identifier of the resource from where the logs are generated; (b) layer from which the logs are generated; (c) the user ID generating the log; (d) the access request ID which granted the access; (e) timestamp of the log. Various types of logging may be implemented, including for example, one or more of the following: (a) keystroke logging; (b) capture of all OS commands executed by operator; (c) logging of all commands executed through a script; and/or (d) logging of commands executed by a delegate (such as a daemon). The time interval may be configured as desired for the logging, e.g., with small time intervals such that the logging is in near-realtime.

At the expiry of the time duration for the operator access, the system deletes the temporary user from the target endpoint. This action may also occur upon an explicit action by the customer to revoke access. This will remove the ability of the operator to access the system.

Figure 3:
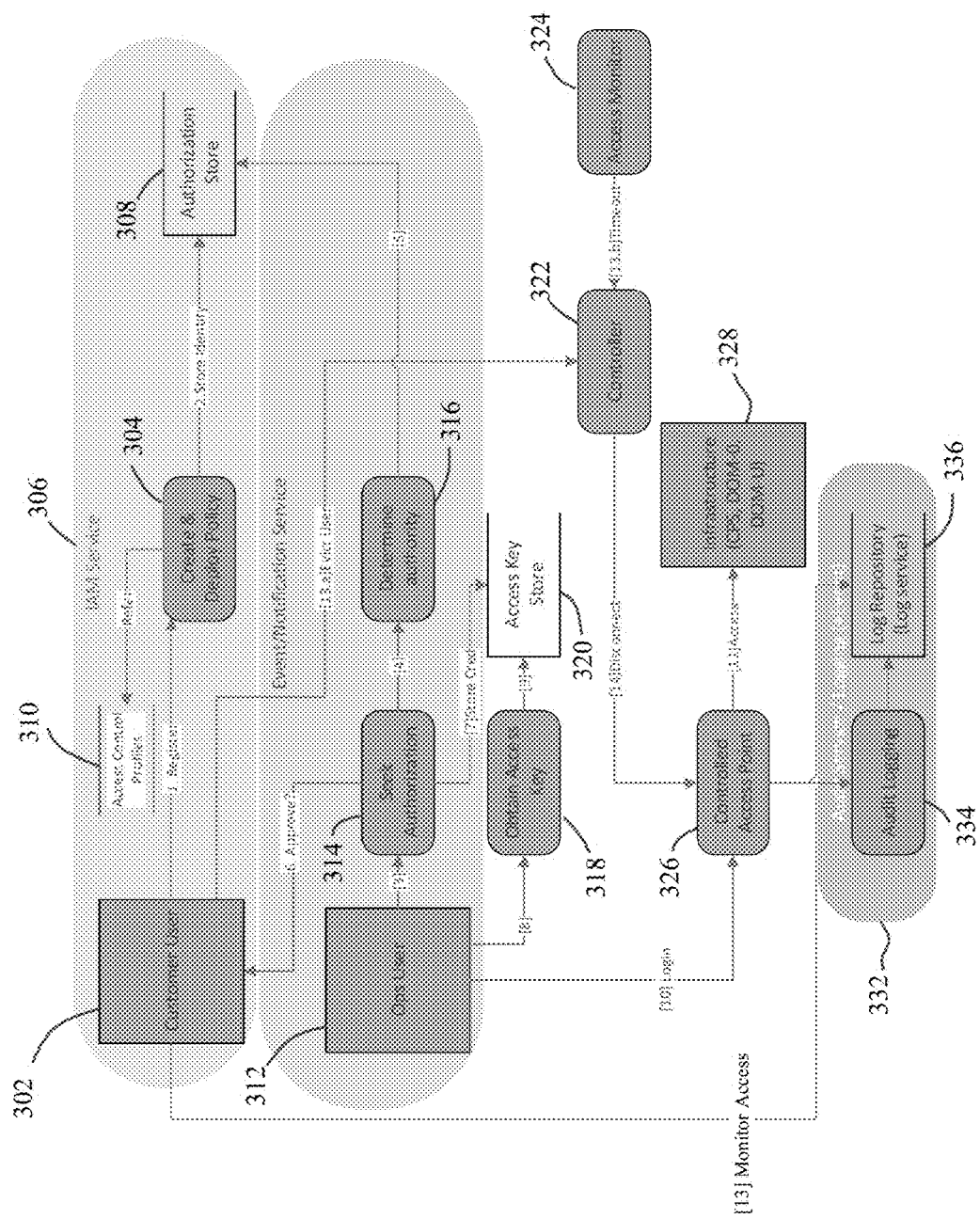
FIG. 3 provides an illustrative view of the processing flows according to some embodiments of the invention.

FIG. 3 provides an illustrative view of the above-described processing flows according to some embodiments of the invention. At (1), the customer user 302 will perform registration of one or more deployment policies 304, which would at (2) be stored within an authorization store 308. The deployment policies 304 may refer to one or more access control profiles 310. These action may take place in the context of any appropriate management layer within the system. In some embodiments, an IAM (identity and access management) service 306 is employed to implement these actions.

At (3), an operator user 312 may submit an access request 314 to seek authorization to access a specified cloud resource. At (4) a determination is made by module 316 as to whether the operator user has the authority to seek the requested access permissions. At (5), this determination may be performed by checking against the authorization store 308. At (6), the request maybe forwarded to the customer user 302 to determine whether the customer will approve or deny the operator's request for access to the cloud resource. It is noted that some or all of these actions may be implemented as an event/notification service 330.

At (7), the credentials for the authorization may be stored within the access key store 320. These credential may be associated with a new temporary user account that is created for the operator user. At (8), an access key 318 may be obtained with respect to the user, e.g., based upon the operator user's public key. At (9), this access key is also stored within the access key store 320.

At (10), the operator user 312 will log into the cloud resource via a controlled access point 326 that is controlled by controller 322. The operator user 312 will log in using the temporary user account that has been created upon approval for the requested access.

At (11), the operator user 312 will thereafter perform its access of the cloud resource 328 for which approval had been granted. An audit/logging service 332 will perform logging 334 of the activities of the operator user 312. The captured logs will be stored within a log repository 336. At (12), the customer user 302 may choose to monitor the access activities of the operator user 312, e.g., by accessing the logs within the log repository 336.

The access privileges of the operator user 312 may later be revoked. This may occur, at (13a), by command of the customer user 302 to the controller 322 to evict the operator user 312. Alternatively an access monitor 324 may note the expiration of the designated time period of the access grant, and at (13b) issue a notification to the controller 322 of the timeout that has occurred for the access rights of the operator user 312. At this point, the controller 322 will operate the controlled access point 326 to revoke access to the operator user 312.

Therefore, what has been described is an improved approach to implement a mechanism to provide customer control over access to cloud infrastructure by the cloud provider's operator employees. This mechanism allows customer controlled access to any cloud infrastructure that belongs to or is allocated to the customer. This approach permits the setup of an approval-based inner perimeter around the infrastructure owned by the cloud provider. The setting of the perimeter can be implemented in such a way that only the operator can request access to cross the perimeter. In addition, the enforcement layer that ensures that cloud provider operators cannot access the infrastructure without customer approval. The enforcement layer may also ensure that customer retains the ability to revoke access any time of their choosing.

System Architecture

Figure 4:
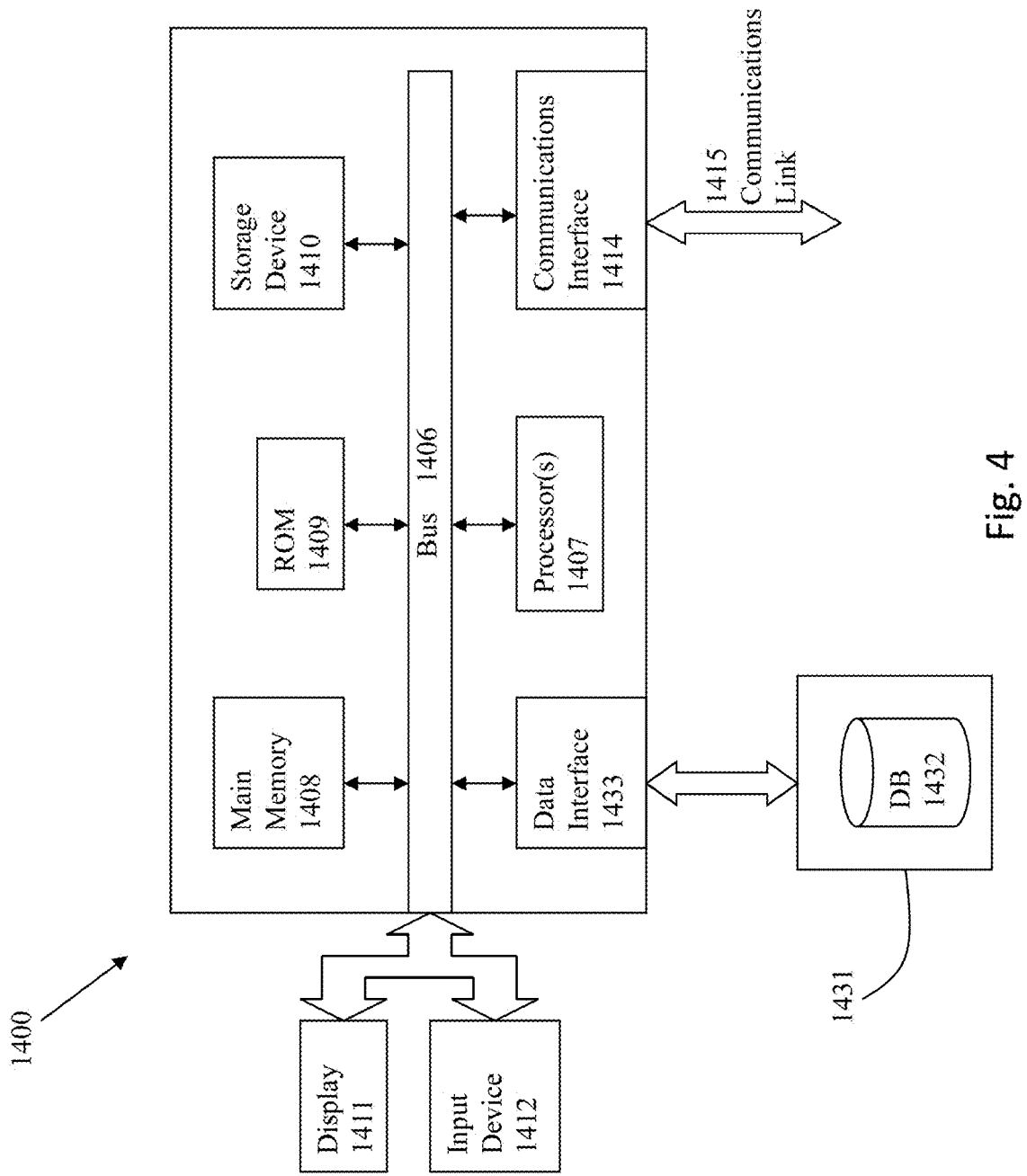
FIG. 4 is a block diagram of an illustrative computing system suitable for implementing an embodiment of the present invention.

FIG. 4 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to some embodiments of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1510 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. A database 1532 in a storage medium 1531 may be used to store data accessible by the system 1500.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 5:
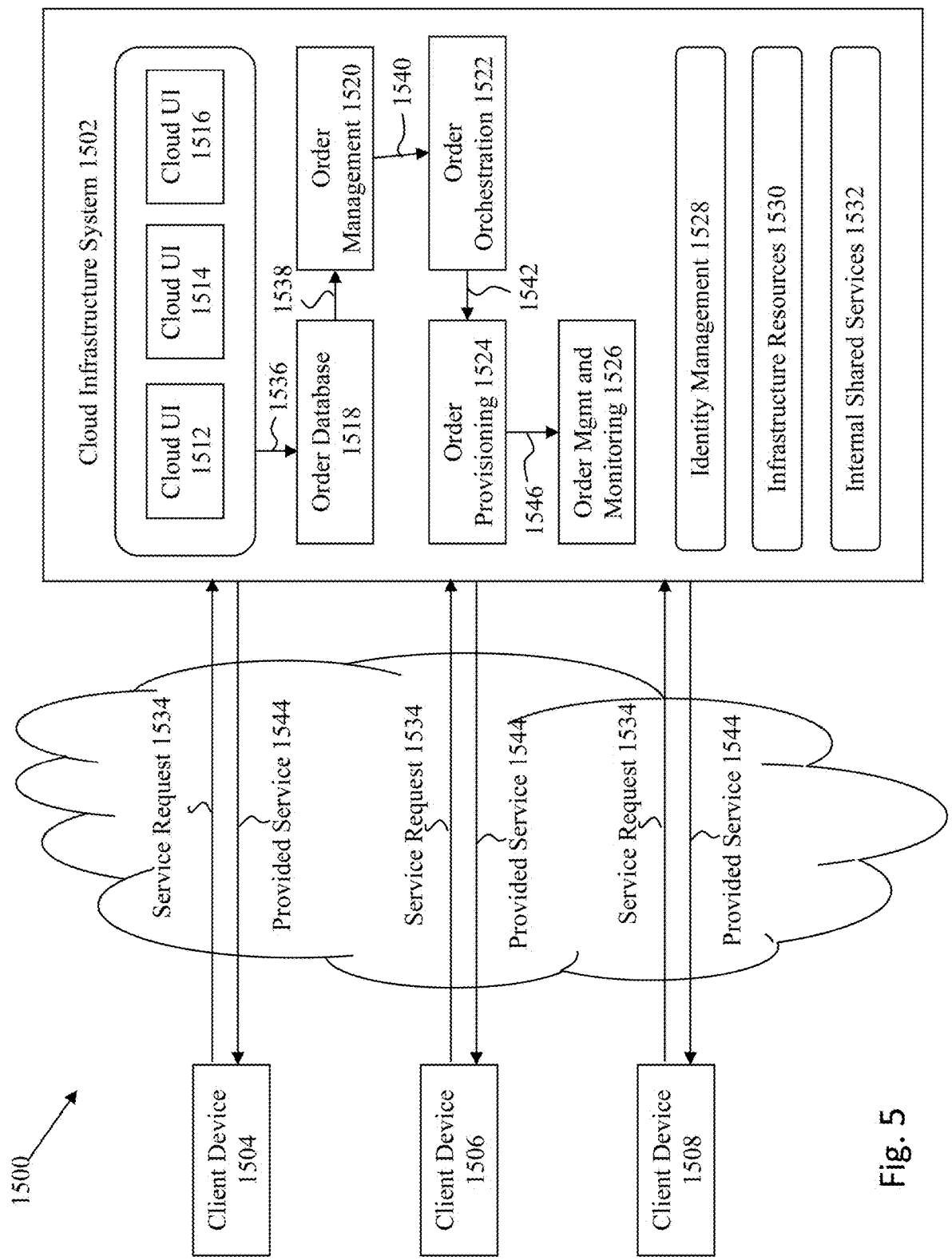
FIG. 5 is a block diagram of one or more components of a system environment in which services may be offered as cloud services, in accordance with an embodiment of the present invention.

FIG. 5 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for FIG. 14. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloudservices via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
    configuring a customer access control mechanism for a computing resource of a cloud infrastructure, wherein the computing resource is managed by a cloud provider, and the customer access control mechanism comprises:
        a set of access control profiles pertaining to access by the cloud provider operator to the computing resource; and
        an access policy that comprises one or more customer access control profiles;
    processing the access request from the cloud provider operator to access the computing resource of the cloud infrastructure; and
    permitting the cloud provider operator to access the computing resource according to an approved access control profile at least by:
        modifying an operating system environment for the cloud provider operator into a modified operating system environment in which the access request is executed; and
        creating a temporary user account for the cloud provider operator based at least in part upon the modified operating system environment; and
    logging one or more activities by the temporary user account in the cloud infrastructure resource.

2. The method of claim 1, wherein an existing user account for the cloud provider operator is removed or disabled prior to receiving the access request from the cloud provider operator.

3. The method of claim 1, further comprising sending a request to a customer user to approve or deny the access request by the cloud provider operator, wherein the request sent to the customer user is based at least in part upon the access policy.

4. The method of claim 1, wherein the access control profiles comprise a named and pre-defined profile of one or more permitted activities by the cloud provider operator to operate one or more commands or access portions of the cloud infrastructure or the computing resource.

5. The method of claim 1, wherein the temporary user account for the cloud provider operator is created by being seeded with a key of the cloud provider operator.

6. The method of claim 1, wherein the cloud provider operator uses a Secure Shell (SSH) to log into the cloud infrastructure resource using the temporary user account.

7. The method of claim 1, further comprising establishing a perimeter within an execution environment of an operating system for the cloud provider operator, wherein the access request is executed within the perimeter, and a chroot environment is created for the temporary user account and the cloud provider operator.

8. The method of claim 1, wherein automated approval is provided for one or more certain types of access requests by the cloud provider operator, and the one or more certain types of access requests include a read-only access request that is automatically granted in response to the access request.

9. The method of claim 1, wherein logging the one or more activities comprises generating a log record that is placed into a log repository according to a specified time interval.

10. The method of claim 1, wherein access for the cloud provider operator is revoked prior to receiving the access request from the cloud provider operator by expiry of a timeout period or by express revocation of the access from an instruction by a customer user.

11. A computer program product embodied on a non-transitory computer readable medium, the non-transitory computer readable medium having stored thereon a sequence of instructions which, when executed by a processor, causes the processor to execute a set of acts comprising:
    configuring a customer access control mechanism for a computing resource of a cloud infrastructure, wherein the computing resource managed by a cloud provider, and the customer access control mechanism comprises:
        a set of access control profiles pertaining to access by a cloud provider operator to the cloud infrastructure resource; and
        an access policy that comprises one or more access control profiles;
    processing an access request from the cloud provider operator to access the computing resource of the cloud infrastructure; and
    permitting the cloud provider operator to access the cloud infrastructure resource according to an approved access control profile, wherein access is provided to the cloud provider operator by:
        modifying an operating system environment for the cloud provider operator into a modified operating system environment in which the access request is executed; and
        creating a temporary user account for the cloud provider operator based at least in part upon the modified operating system environment; and
    logging one or more activities by the temporary user account in the cloud infrastructure resource.

12. The computer program product of claim 11, wherein the sequence of instructions when executed by the processor removes or disables an existing user account for the cloud provider operator prior to receiving the access request from the cloud provider operator.

13. The computer program product of claim 11, wherein the sequence of instructions when executed by the processor further performs sending a request to a customer user to approve or deny the access request by the cloud provider operator, wherein the request sent to the customer user is based at least in part upon the access policy.

14. The computer program product of claim 11, wherein the access control profiles comprise a named and pre-defined profile of one or more permitted activities by the cloud provider operator to operate one or more commands or access portions of the cloud infrastructure or the computing resource.

15. The computer program product of claim 11, wherein the temporary user account for the cloud provider operator is created by being seeded with public key of the cloud provider operator.

16. The computer program product of claim 11, wherein the sequence of instructions when executed by the processor uses the temporary user account to permit the cloud provider operator to use a Secure Shell (SSH) to log into the cloud infrastructure resource.

17. The computer program product of claim 11, wherein the sequence of instructions when executed by the processor causes the processor to execute the set of acts, the set of acts further comprising establishing a perimeter within an execution environment of an operating system for the cloud provider operator, and creating a chroot environment for the temporary user account and the cloud provider operator.

18. The computer program product of claim 11, wherein the sequence of instructions when executed by the processor provides automated approval for one or more certain types of access requests by the cloud provider operator, and the one or more certain types of access requests include a read-only access request that is automatically granted in response to the access request.

19. The computer program product of claim 11, wherein the sequence of instructions when executed by the processor logs the activities by generating a log record that is placed into a log repository according to a specified time interval.

20. The computer program product of claim 11, wherein the sequence of instructions, when executed by the processor, causes the processor to revoke, prior to receiving the access request from the cloud provider operator, access for the cloud provider operator by expiry of a timeout period or by express revocation of the access from an instruction by a customer user.

21. A system, comprising:
a processor;
a memory for holding programmable code; and
wherein the programmable code includes instructions executable by the processor for:
configuring a customer access control mechanism for a computing resource of a cloud infrastructure, wherein the computing resource that is managed by a cloud provider, and the customer access control mechanism comprises:
a set of access control profiles pertaining to access by the cloud provider operator to the computing resource; and
an access policy that comprises one or more customer access control profiles;
processing an access request from the cloud provider operator to access the computing resource of the cloud infrastructure; and
permitting the cloud provider operator to access the computing resource according to an approved access control profile, at least by:
modifying an operating system environment for the cloud provider operator into a modified operating system environment in which the access request is executed; and
creating a temporary user account for the cloud provider operator based at least in part upon the modified operating system environment;
logging one or more activities by the temporary user account in the cloud infrastructure resource.

22. The system of claim 21, wherein the instructions, when executed by the processor, cause the processor to remove or disable an existing user account for the cloud provider operator prior to receiving the access request from the cloud provider operator.

23. The system of claim 21, wherein the access control profiles comprise a named and pre-defined profile of one or more permitted activities by the cloud provider operator to operate one or more commands or access one or more portions of the cloud infrastructure or the computing resource.

24. The system of claim 21, wherein the temporary user account for the cloud provider operator is created by being seeded with a key of the cloud provider operator.

25. The system of claim 21, wherein the instructions, when executed by the processor, cause the processor to use the temporary user account to permit the cloud provider operator to use a Secure Shell (SS H) to log into the cloud infrastructure resource.

26. The system of claim 21, wherein the instructions, when executed by the processor, cause the processor to establishing a perimeter within an execution environment of an operating system for the cloud provider operator, and tocreate a chroot environment for the temporary user account and the cloud provider operator.

27. The system of claim 21, wherein the instructions, when executed by the processor, cause the processor to provide automated approval for one or more certain types of access requests by the cloud provider operator, and the one or more certain types of access requests include a read-only access request that is automatically granted in response to the access request.

28. The system of claim 21, wherein the instructions, when executed by the processor, causes the processor to log the one or more activities, and logging the one or more activities by comprises generating a log record that is placed into a log repository according to a specified time interval.

29. The system of claim 21 wherein the instructions, when executed by the processor, cause the processor to revoke, prior to receiving the access request from the cloud provider operator, access for the cloud provider operator by expiry of a timeout period or by express revocation of the access from an instruction by a customer user.

* * * * *

UNITED STATES PATENT AND TRADEMARK OFFICE
CERTIFICATE OF CORRECTION

PATENT NO. : 11,949,680 B2
APPLICATION NO. : 17/245943
DATED : April 2, 2024
INVENTOR(S) : Ramamurthi et al.

It is certified that error appears in the above-identified patent and that said Letters Patent is hereby corrected as shown below:

In the Specification

In Column 5, Line 62, delete "log into into" and insert -- login into --, therefor.

In Column 10, Line 3, delete "cloudservices" and insert -- cloud services --, therefor.

In the Claims

In Column 15, Line 7, in Claim 15, delete "public" and insert -- a --, therefor.

In Column 15, Line 46, in Claim 21, delete "that is" and insert -- is --, therefor.

In Column 16, Line 3, in Claim 21, delete "profile," and insert -- profile --, therefor.

In Column 16, Line 30, in Claim 25, delete "(SS H)" and insert -- (SSH) --, therefor.

In Column 16, Line 36, in Claim 26, delete "tocreate" and insert -- to create --, therefor.

In Column 16, Line 48, in Claim 28, after "activities" delete "by".

Signed and Sealed this
Sixth Day of August, 2024

Katherine Kelly Vidal
*Director of the United States Patent and Trademark Office*